United States Patent
Kim et al.

(10) Patent No.: US 10,643,620 B2
(45) Date of Patent: May 5, 2020

(54) SPEECH RECOGNITION METHOD AND APPARATUS USING DEVICE INFORMATION

(71) Applicant: SAMSUNG ELECTRONICS CO., LTD., Suwon-si (KR)

(72) Inventors: Tae-yoon Kim, Seoul (KR); Chang-woo Han, Seoul (KR); Jae-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/313,660

(22) PCT Filed: May 6, 2015

(86) PCT No.: PCT/KR2015/004504
§ 371 (c)(1),
(2) Date: Nov. 23, 2016

(87) PCT Pub. No.: WO2015/178600
PCT Pub. Date: Nov. 26, 2015

(65) Prior Publication Data
US 2017/0206903 A1    Jul. 20, 2017

(30) Foreign Application Priority Data
May 23, 2014    (KR) .................. 10-2014-0062586

(51) Int. Cl.
*G10L 15/30*    (2013.01)
*G10L 15/183*   (2013.01)
*G10L 15/02*    (2006.01)

(52) U.S. Cl.
CPC .............. *G10L 15/30* (2013.01); *G10L 15/02* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 6,363,348 B1 * | 3/2002 | Besling | G06K 9/6217 704/251 |
| 6,366,882 B1 * | 4/2002 | Bijl | G06F 3/16 704/231 |
| 6,434,526 B1 | 8/2002 | Ciluzro et al. | |

(Continued)

FOREIGN PATENT DOCUMENTS

| EP | 1104155 A2 | 5/2001 |
|---|---|---|
| EP | 2 713 366 A1 | 4/2014 |

(Continued)

OTHER PUBLICATIONS

Int. Search Report dated Jul. 31, 2015 issued by the Int. Searching Authority in Application No. PCT/KR/2015/004504.

*Primary Examiner* — Jonathan C Kim
(74) *Attorney, Agent, or Firm* — Sughrue Mion, PLLC

(57) ABSTRACT

A speech recognition method includes: storing at least one acoustic model (AM); obtaining, from a device located outside the ASR server, a device ID for identifying the device; obtaining speech data from the device; selecting an AM based on the device ID; performing speech recognition on the speech data by using the selected AM; and outputting a result of the speech recognition.

8 Claims, 7 Drawing Sheets

(56) References Cited

U.S. PATENT DOCUMENTS

| | | | | |
|---|---|---|---|---|
| 6,766,295 B1* | 7/2004 | Murveit | | G10L 15/30 |
| | | | | 379/88.01 |
| 6,799,162 B1* | 9/2004 | Goronzy | | G10L 15/063 |
| | | | | 704/244 |
| 6,944,760 B2* | 9/2005 | Wills | | H04L 63/0281 |
| | | | | 370/352 |
| 7,174,298 B2* | 2/2007 | Sharma | | G10L 15/065 |
| | | | | 379/406.06 |
| 7,231,019 B2* | 6/2007 | Pascovici | | G10L 17/16 |
| | | | | 379/88.02 |
| 7,983,911 B2 | 7/2011 | Soufflet et al. | | |
| 8,185,392 B1* | 5/2012 | Strope | | G10L 15/01 |
| | | | | 704/252 |
| 8,571,859 B1* | 10/2013 | Aleksic | | G10L 15/07 |
| | | | | 704/231 |
| 9,159,315 B1* | 10/2015 | Mengibar | | G10L 15/005 |
| 9,218,806 B1* | 12/2015 | Salvador | | G10L 15/02 |
| 9,401,140 B1* | 7/2016 | Weber | | G10L 15/00 |
| 9,443,527 B1* | 9/2016 | Watanabe | | G10L 15/22 |
| 9,786,281 B1* | 10/2017 | Adams | | G10L 15/265 |
| 2002/0191795 A1* | 12/2002 | Wills | | H04L 63/0281 |
| | | | | 380/270 |
| 2004/0230420 A1* | 11/2004 | Kadambe | | G10L 15/07 |
| | | | | 704/205 |
| 2005/0075875 A1* | 4/2005 | Shozakai | | G06K 9/00335 |
| | | | | 704/231 |
| 2006/0149558 A1* | 7/2006 | Kahn | | G10L 15/063 |
| | | | | 704/278 |
| 2006/0195321 A1* | 8/2006 | Deligne | | G10L 15/065 |
| | | | | 704/257 |
| 2007/0061142 A1* | 3/2007 | Hernandez-Abrego | | |
| | | | | G10L 17/04 |
| | | | | 704/247 |
| 2010/0195806 A1* | 8/2010 | Zhang | | H04M 3/42153 |
| | | | | 379/88.01 |
| 2011/0066433 A1* | 3/2011 | Ljolje | | G10L 15/07 |
| | | | | 704/236 |
| 2011/0295590 A1* | 12/2011 | Lloyd | | G10L 15/065 |
| | | | | 704/8 |
| 2012/0253811 A1* | 10/2012 | Breslin | | G10L 15/26 |
| | | | | 704/249 |
| 2012/0317418 A1* | 12/2012 | Brundridge | | G06F 21/105 |
| | | | | 713/176 |
| 2013/0294587 A1* | 11/2013 | Arrowood | | G10L 15/07 |
| | | | | 379/88.01 |
| 2013/0311184 A1* | 11/2013 | Badavne | | G10L 15/14 |
| | | | | 704/250 |
| 2014/0075244 A1* | 3/2014 | Takahashi | | G06F 11/3668 |
| | | | | 714/38.1 |
| 2014/0278397 A1* | 9/2014 | Chen | | G10L 21/02 |
| | | | | 704/233 |
| 2014/0303970 A1* | 10/2014 | Bell | | G10L 15/20 |
| | | | | 704/233 |
| 2015/0019220 A1* | 1/2015 | Talhami | | G10L 15/063 |
| | | | | 704/244 |
| 2015/0081300 A1* | 3/2015 | Kim | | G10L 15/07 |
| | | | | 704/246 |
| 2015/0120287 A1* | 4/2015 | Stern | | G10L 15/22 |
| | | | | 704/231 |
| 2015/0364139 A1* | 12/2015 | Dimitriadis | | G06K 9/00335 |
| | | | | 704/231 |
| 2016/0372116 A1* | 12/2016 | Summerfield | | G10L 25/63 |

FOREIGN PATENT DOCUMENTS

| | | | |
|---|---|---|---|
| KR | 10-2006-0083621 A | 7/2006 | |
| WO | WO-2017034536 A1 * | 3/2017 | G10L 15/22 |

* cited by examiner

[Fig. 1]
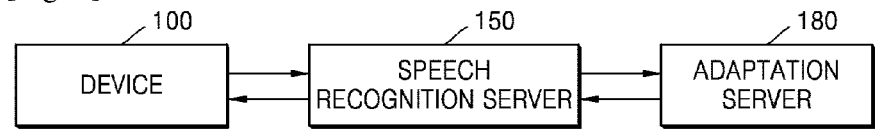
[Fig. 2]
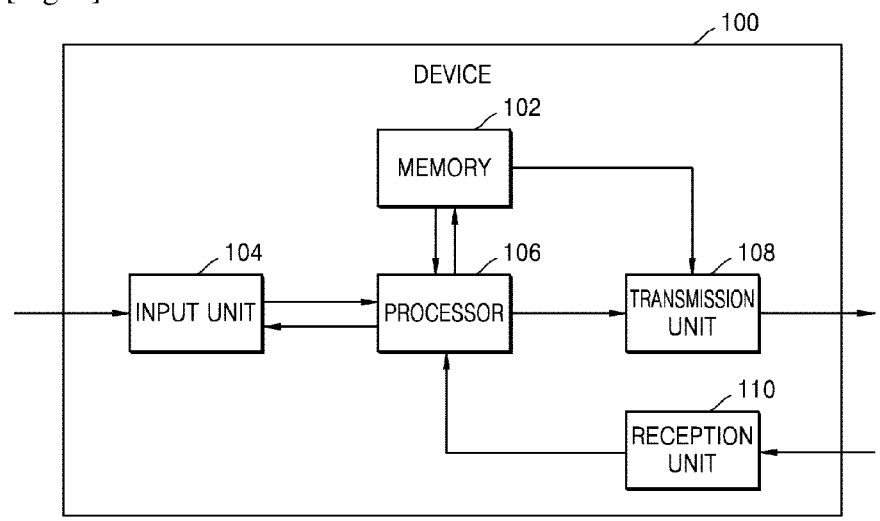
[Fig. 3a]
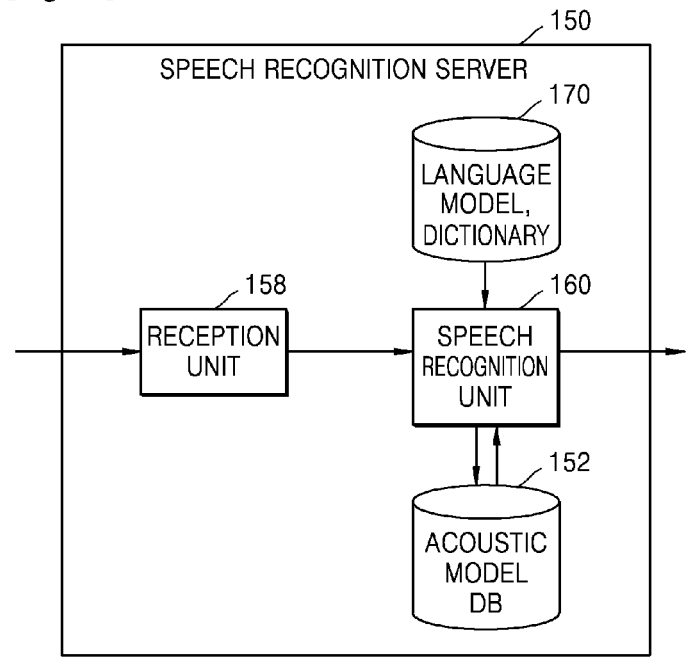

[Fig. 3b]
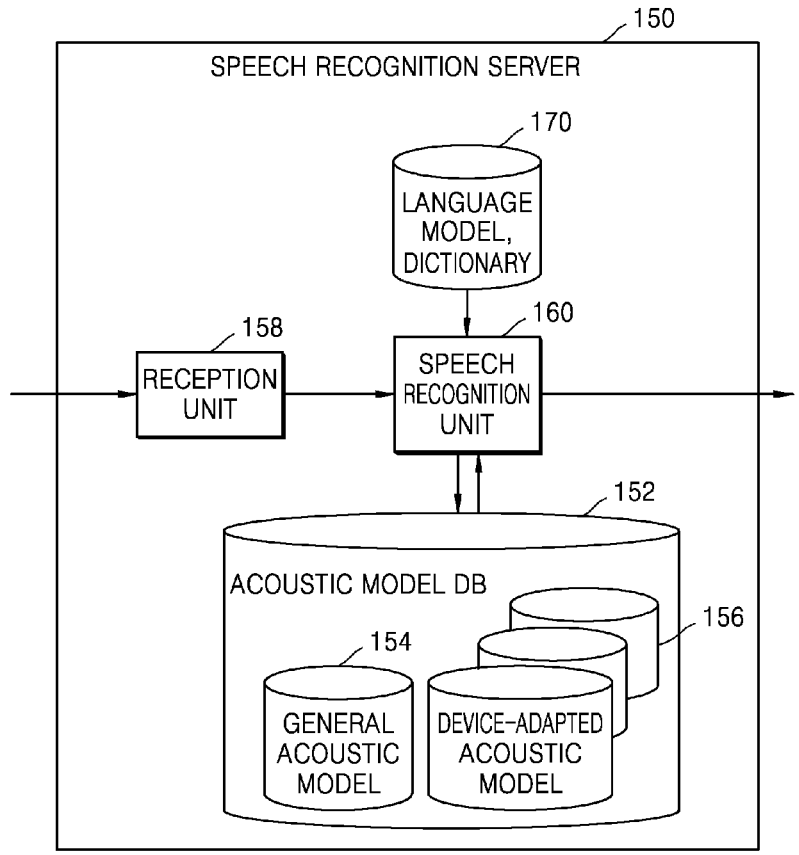
[Fig. 3c]
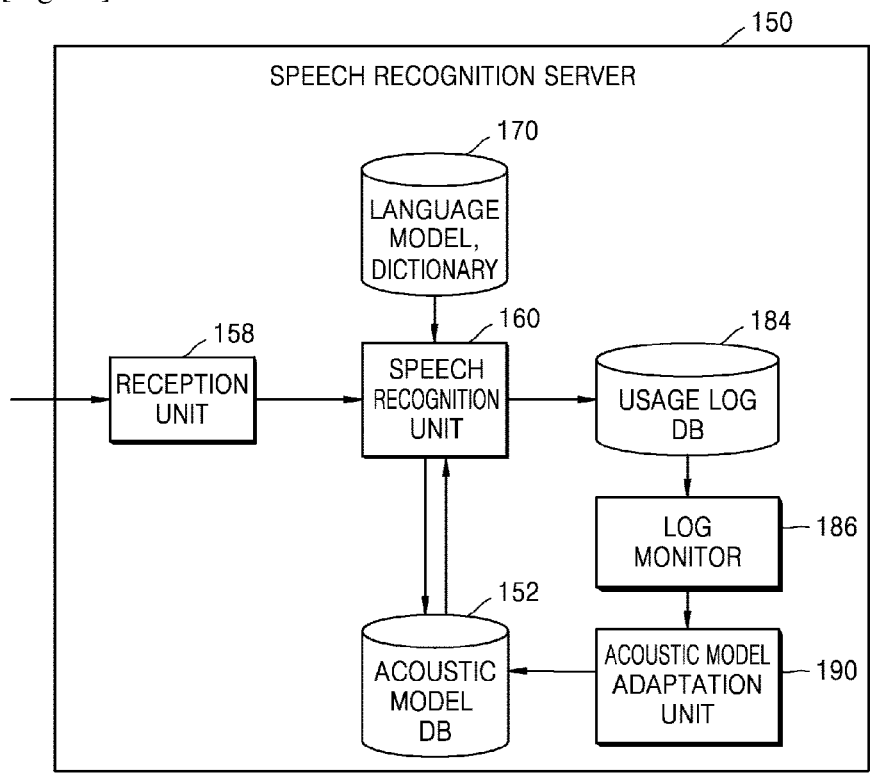

[Fig. 4a]
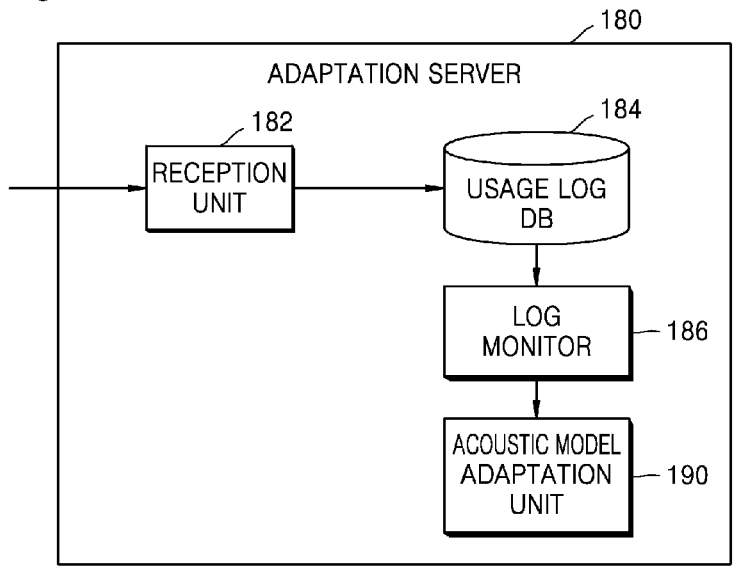
[Fig. 4b]
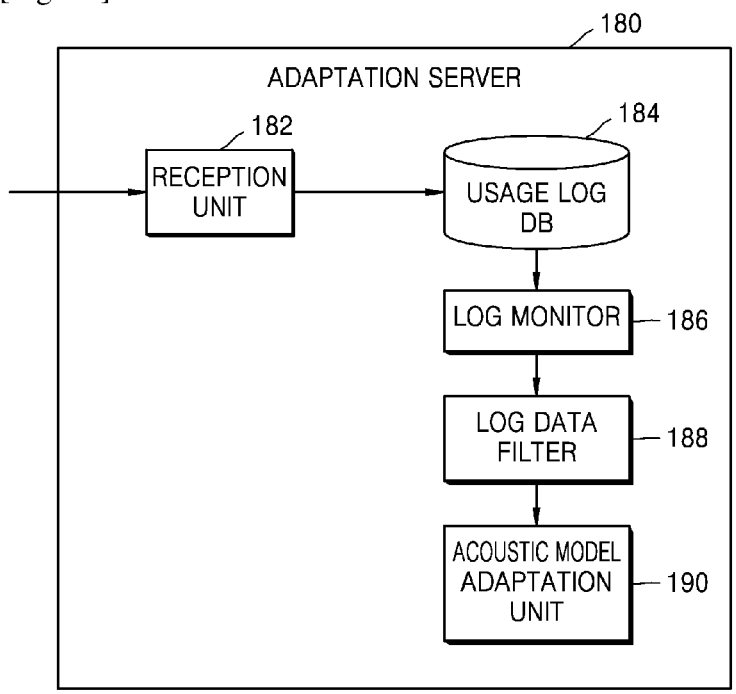

[Fig. 5]
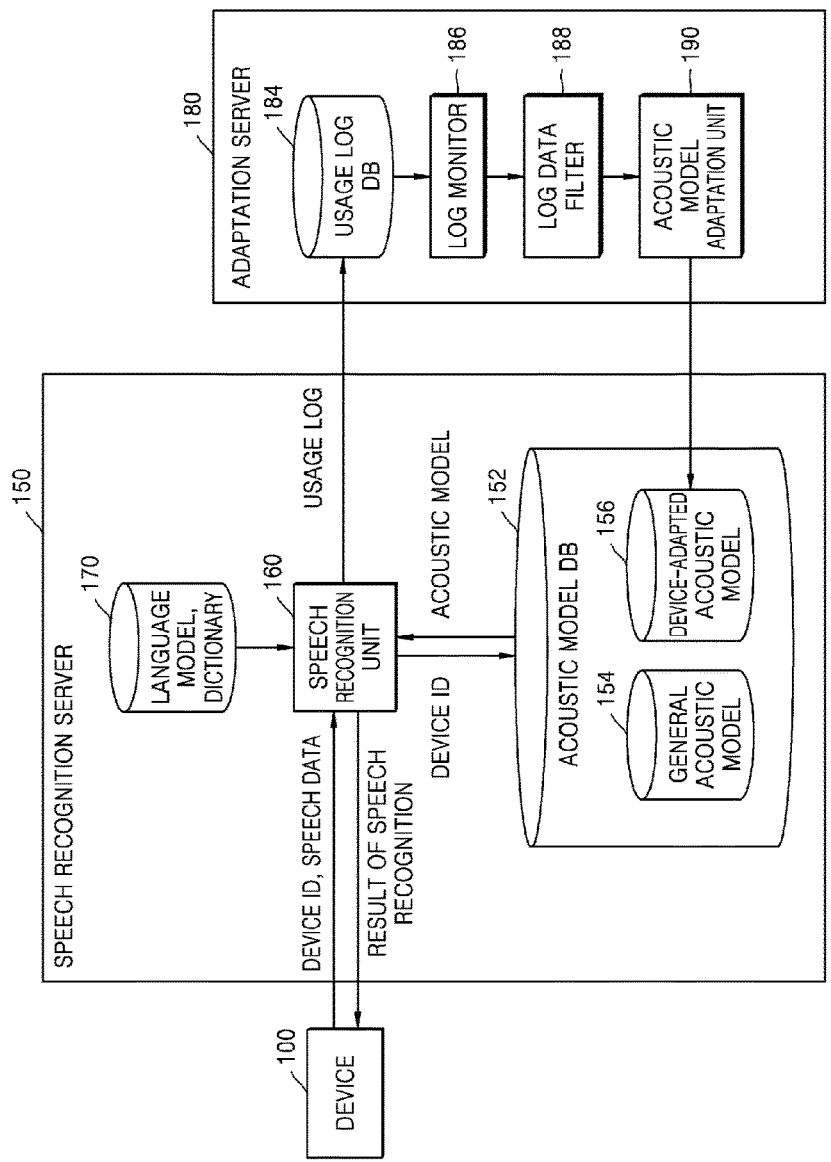
[Fig. 6a]
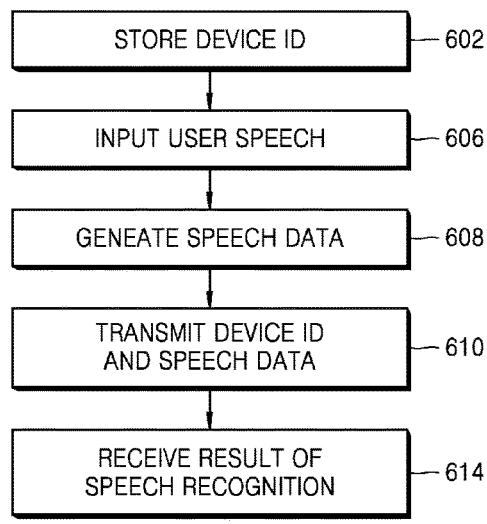

[Fig. 6b]
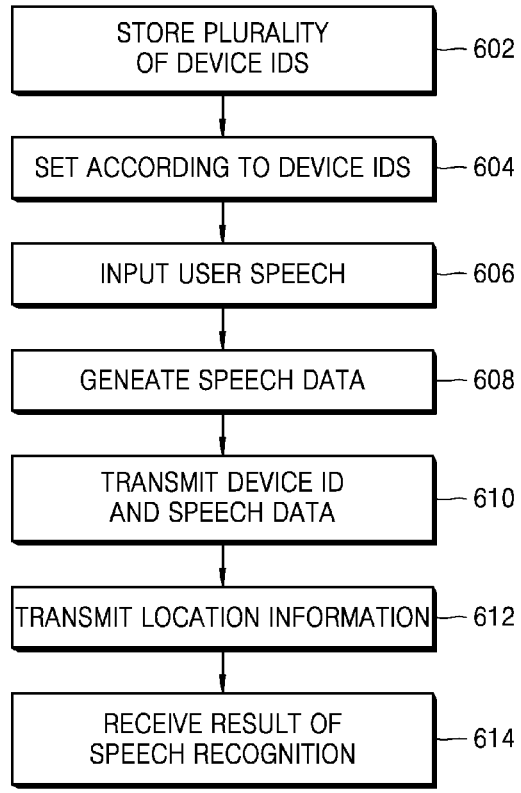
[Fig. 7a]
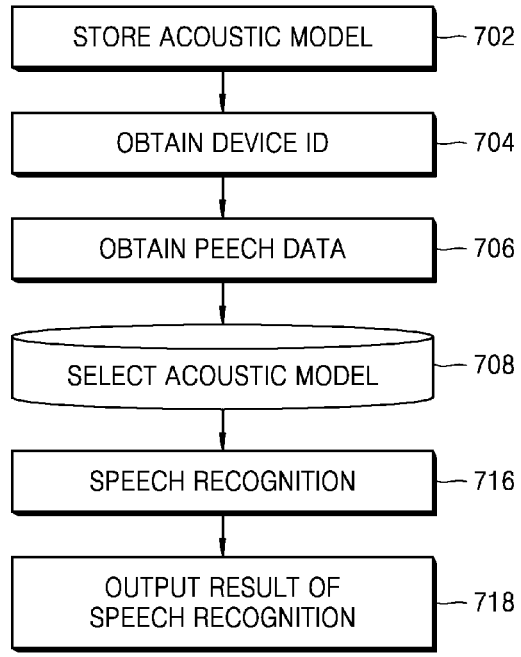

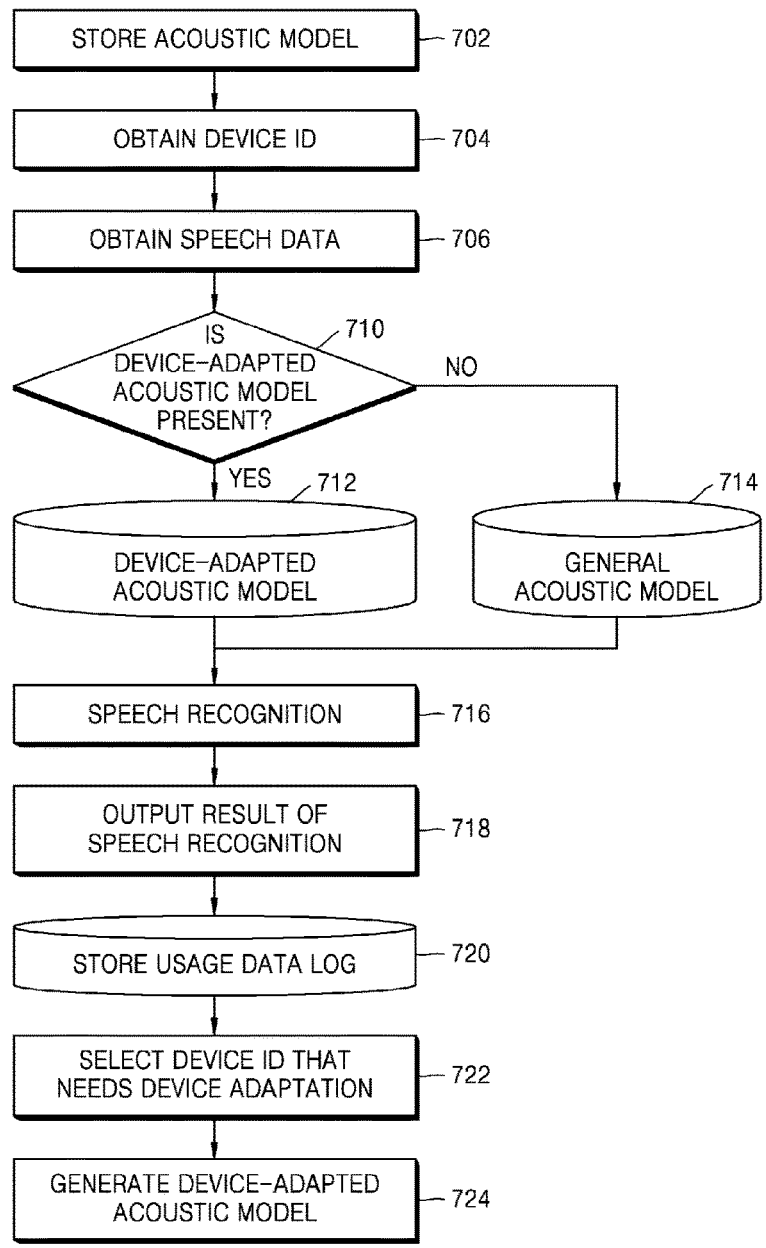
[Fig. 7b]
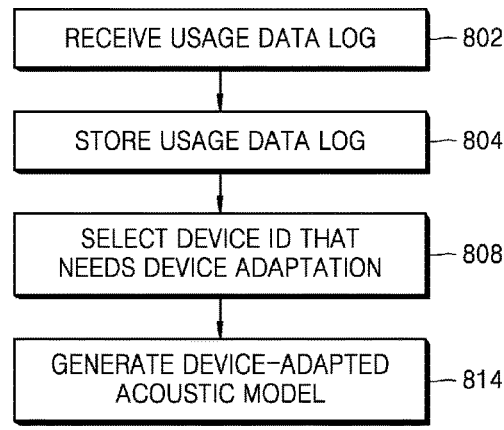
[Fig. 8a]

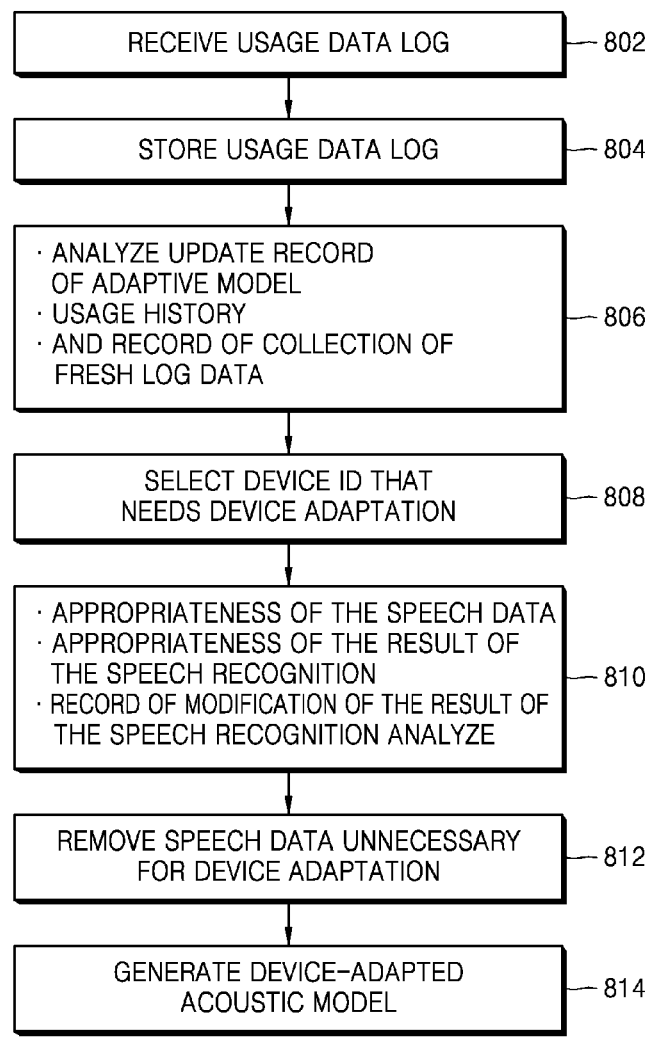

SPEECH RECOGNITION METHOD AND APPARATUS USING DEVICE INFORMATION

TECHNICAL FIELD

One or more exemplary embodiments relate to a speech recognition method and apparatus, and more particularly, to a speech recognition method and apparatus for generating an acoustic model appropriate for a device by using an adaptation method using device information, and performing speech recognition by using the generated acoustic model (AM).

BACKGROUND ART

Speech recognition is technology for receiving the speech of a user, automatically converting the speech into text, and recognizing the text. Recently, speech recognition is employed as technology for substituting a keyboard input when used in a smartphone or a TV.

A speech recognition system is divided into a client that is a part that receives a speech signal input, and an automatic speech recognition (ASR) engine that is a part that performs speech recognition based on the speech signal. The client and the ASR engine may be separately designed. In this case, a smartphone or a TV may be configured in the form of a client, and the ASR engine may be configured in the form of a server.

The speech recognition system generally consists of an acoustic model (AM) and a language model (LM). The AM is formed as a model of a speech signal, and is generated by using a statistical method performed by collecting a large amount of speech data. The LM is a grammatical model for a user's speech, and also obtained by using a statistical learning method performed by collecting a large amount of text data.

A large amount of data needs to be collected to ensure the performance of the AM and the LM. A speaker-independent model refers to a model formed based on a plurality of unspecified speeches, whereas a speaker-dependent model refers to a model formed by collecting data from a specified speaker. If a sufficient amount of data may be collected, the speaker-independent model may have higher performance than the speaker-dependent model.

Since it may be realistically difficult to collect a sufficient amount of data to ensure performance with respect to a specified speaker, a method of efficiently changing an existing speaker-independent AM by using an appropriate amount of data has been provided. This method is referred to as a speaker adaptation for an AM.

A process of collecting data with respect to a specified speaker is necessary so as to employ speaker adaptation for an AM. For this, a process of collecting data by registering a specified speaker has been employed in the related art.

As an example, a first user may generate his/her account and perform a user registration process so as to use a speech recognition service. In the user registration process, a user may read a predetermined sentence to be registered for the speech recognition service, and in this case, accurate data may be obtained. However, this may cause user inconvenience, since the user may be required to perform a process that is inconvenient to the user.

As another method, speech recognition may be performed right after an account of a user is generated for a first time, and data obtained during the speech recognition may be used to perform speaker adaptation. In this case, the speaker adaptation starts to be performed from a second speech of the first user, or a speaker adaptation model is employed from a second connection to the speech recognition service.

DISCLOSURE

Description of Drawings

These and/or other aspects will become apparent and more readily appreciated from the following description of the exemplary embodiments, taken in conjunction with the accompanying drawings in which:

FIG. 1 illustrates a schematic block diagram of a speech recognition system using device adaptation, according to an exemplary embodiment;

FIG. 2 illustrates a diagram of a device according to an exemplary embodiment;

FIG. 3A illustrates a diagram of an automatic speech recognition (ASR) server according to an exemplary embodiment;

FIG. 3B illustrates a diagram of the ASR server according to another exemplary embodiment;

FIG. 3C illustrates a diagram of the ASR server according to another exemplary embodiment;

FIG. 4A illustrates a diagram of an adaptation server according to an exemplary embodiment;

FIG. 4B illustrates a diagram of the adaptation server according to another exemplary embodiment;

FIG. 5 illustrates a block diagram for explaining a speech recognition and speech model adaptation system according to an exemplary embodiment;

FIG. 6A illustrates a flowchart of a method of recognizing speech, according to an exemplary embodiment;

FIG. 6B illustrates a flowchart of a method of recognizing speech, according to another exemplary embodiment;

FIG. 7A illustrates a flowchart of a method of recognizing speech, according to an exemplary embodiment;

FIG. 7B illustrates a flowchart of a method of recognizing speech, according to another exemplary embodiment;

FIG. 8A illustrates a flowchart of an acoustic model adaptation method according to an exemplary embodiment; and FIG. 8B illustrates a flowchart of an acoustic model adaptation method according to another exemplary embodiment.

BEST MODE

One or more exemplary embodiments include a new account model adaptation method that may be used in a server-client speech recognition environment.

Additional aspects will be set forth in part in the description which follows and, in part, will be apparent from the description, or may be learned by practice of the presented exemplary embodiments.

According to one or more exemplary embodiments, an automatic speech recognition (ASR) server includes: an acoustic model (AM) database configured to store at least one AM; a reception unit configured to receive, from a device located outside the ASR server, a device ID for identifying the device and speech data; and a speech recognition unit configured to select an AM based on the device ID, perform speech recognition on the speech data by using the selected AM, and output a result of the speech recognition.

The AM database may store a general AM and at least one device-adapted AM, and if a device-adapted AM corresponding to the device ID is stored in the AM database, the speech recognition unit may perform speech recognition on the speech data by using the device-adapted AM, and if the device-adapted AM corresponding to the device ID is not stored in the AM database, the speech recognition unit may perform speech recognition on the speech data by using the general AM.

The ASR server may further include: a usage log database configured to store a usage data log that includes the result of the speech recognition and the speech data corresponding to the result of the speech recognition; a log monitor configured to select a device ID that needs device adaptation, by monitoring the usage log database; and an AM adaptation unit configured to generate a device-adapted AM corresponding to the selected device ID, by using speech data of the usage data log corresponding to the selected device ID.

According to one or more exemplary embodiments, a speech recognition method includes: storing at least one acoustic model (AM); obtaining, from a device located outside the ASR server, a device ID for identifying the device; obtaining speech data from the device; selecting an AM based on the device ID; performing speech recognition on the speech data by using the selected AM; and outputting a result of the speech recognition.

The storing of the at least one AM may include storing a general AM and at least one device-adapted AM, and the selecting of the AM may include: determining whether a device-adapted AM corresponding to the device ID is present; and selecting the device-adapted AM if the device-adapted AM corresponding to the device ID is present, and selecting the general AM if the device-adapted AM corresponding to the device ID is not present.

The speech recognition method may further include: storing a usage data log that includes the result of the speech recognition and the speech data corresponding to the result of the speech recognition in a usage log database; selecting a device ID that needs device adaptation, by monitoring the usage log database; and generating a device-adapted AM corresponding to the selected device ID, by using speech data of the usage data log corresponding to the selected device ID.

According to one or more exemplary embodiments, a device includes: a memory configured to store a device ID for identifying a device; an input unit configured to receive an input of a speech for speech recognition; a processor configured to generate speech data by processing the speech; a transmission unit configured to transmit the device ID and the speech data to an automatic speech recognition (ASR) server; and a reception unit configured to receive a result of the speech recognition performed on the speech data from the ASR server.

The processor may extract data, which is needed for the speech recognition, as speech data.

The device may have a plurality of device identifications (IDs).

A setting of the device may vary depending on the device IDs.

The transmission unit may transmit location information of the device.

According to one or more exemplary embodiments, a speech recognition method includes: storing a device ID for identifying a device; receiving an input of speech for speech recognition; generating speech data by processing the speech; transmitting the device ID and the speech data to an automatic speech recognition (ASR) server; and receiving a result of the speech recognition performed on the speech data from the ASR server.

The generating of the speech data may include extracting data, which is needed for the speech recognition, as speech data.

The device may have a plurality of device identifications (IDs).

The speech recognition method may further include setting the device variously depending on the device IDs.

The transmitting may further include transmitting location information of the device.

According to one or more exemplary embodiments, an adaptation server includes: a receiving unit configured to receive a usage data log that includes a device identification (ID), speech data of a device identified by the device ID, and a usage data log that includes a result of speech recognition performed on the speech data; a usage log database configured to store the usage data log; a log monitor configured to select a device ID that needs device adaptation, by monitoring the usage log database; and an acoustic model (AM) adaptation unit configured to generate a device-adapted AM corresponding to the selected device ID, by using speech data of the usage data log corresponding to the selected device ID.

The adaptation server may further include a log data filter configured to remove speech data unnecessary for the device adaptation from the usage data log corresponding to the selected device ID, wherein the AM adaptation unit generates a device-adapted AM corresponding to the selected device ID, by using speech data of the usage data log from which the unnecessary speech data is removed.

The log monitor may use at least one selected from the group consisting of an update record of an adaptive model, a usage history, and a record of collection of fresh log data so as to analyze the usage log database.

The log data filter may use at least one selected from the group consisting of appropriateness of the speech data, appropriateness of the result of the speech recognition, and a modification record of the result of the speech recognition so as to analyze the usage log database.

According to one or more exemplary embodiments, a method of adapting an acoustic model (AM) includes: receiving a device identification (ID), speech data of a device identified by the device ID, a usage data log that includes a result of speech recognition performed on the speech data; storing the usage data log in a usage log database; selecting a device ID that needs device adaptation, by monitoring the usage log database; and generating a device-adapted AM corresponding to the selected device ID, by using speech data of the usage data log corresponding to the selected device ID.

The method may further include removing speech data unnecessary for the device adaptation from the usage data log corresponding to the selected device ID, wherein the generating of the device-adapted AM includes generating a device-adapted AM corresponding to the selected device ID, by using speech data of the usage data log from which the unnecessary speech data is removed.

The selecting of the device ID may include analyzing the usage log database by using at least one selected from the group consisting of an update record of an adaptive model, a usage history, and a record of collection of fresh log data.

The removing of the speech data unnecessary for the adaptation to the device may include analyzing the usage log database by using at least one selected from the group consisting of appropriateness of the speech data, appropriateness of the result of the speech recognition, and a modification record of the result of the speech recognition.

According to one or more exemplary embodiments, a non-transitory computer-readable recording storage medium having stored thereon a computer program, which when executed by a computer, may perform the method.

According to one or more exemplary embodiments, speech recognition system includes a device, an automatic speech recognition (ASR) server, and an adaptation server, wherein the device transmits a device ID for identifying the device, and speech data to the ASR server, the ASR server receives the device ID for identifying the device, and the speech data from the device, and selects an acoustic model (AM) based on the device ID, performs speech recognition on the speech data by using the selected AM, and outputs a result of the speech recognition, and the adaptation server receives the device ID, the speech data of the device identified by the device ID, a usage data log that includes a result of the speech recognition performed on the speech data, and generates a device-adapted AM corresponding to the device ID, by using the speech data of the usage data log corresponding to the device ID.

MODE FOR INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. The embodiments are provided so that this disclosure will be thorough and complete, and will fully convey the concept of the inventive concept to those skilled in the art, and the scope of the inventive concept should be defined by the appended claims. As used herein, the term "and/or" includes any and all combinations of one or more of the associated listed items. Expressions such as "at least one of", when preceding a list of elements, modify the entire list of elements and do not modify the individual elements of the list.

Terms used herein will be briefly described, and the inventive concept will be described in detail below.

General and widely-used terms have been employed herein, in consideration of functions provided in the inventive concept, and may vary according to an intention of one of ordinary skill in the art, a precedent, or emergence of new technologies. Additionally, in some cases, an applicant may arbitrarily select specific terms. Then, the applicant will provide the meaning of the terms in the description of the inventive concept. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises", "comprising", "includes", and/or "including," when used herein, specify the presence of components, but do not preclude the presence or addition of one or more other components, unless otherwise specified. Additionally, a term 'unit' means software or hardware components such as a field programmable gate array (FPGA) or an application-specific integrated circuit (ASIC), and a "unit" performs some functions. However, a "unit" is not limited to hardware or software. A "unit" may be configured to be included in a storage medium that may be addressed, or configured to play one or more processors. Accordingly, as an example, a "unit" includes components such as software components, object-oriented software components, class components, or task components, processes, functions, attributes, procedures, subroutines, segments of a program code, drivers, firmware, micro-codes, circuits, data, databases, data structures, tables, arrays, or variables. Functions provided in components or "units" may be combined into a small number of components or "units", or separated into additional components or "units".

The inventive concept will now be described more fully with reference to the accompanying drawings, in which exemplary embodiments of the inventive concept are shown. In the description of the inventive concept, certain detailed explanations of the related art are omitted when it is deemed that they may unnecessarily obscure the essence of the inventive concept.

FIG. 1 illustrates a schematic block diagram of a speech recognition system using device adaptation, according to an exemplary embodiment.

Referring to FIG. 1, the speech recognition system using device adaption includes a device 100 that is a client device, an automatic speech recognition (ASR) server 150, and an adaptation server 180. In FIG. 1, the ASR server 150 and the adaptation server 180 are shown as separate devices, but this is only an exemplary embodiment. The ASR server 150 and the adaptation server 180 may constitute one device, for example, the speech recognition server 150 may include the adaptation server 180. Additionally, according to exemplary embodiments to be described with reference to drawings, each element of the ASR server 150 or the adaptation server 180 may be distributed separately or combined.

The device 100 transmits a device identification (ID) for identifying the device 100 and speech data to the ASR server 150.

The ASR server 150 receives the device ID for identifying the device 100 and the speech data from the device 100 and selects an acoustic model (AM) based on the device ID. The ASR server 150 performs speech recognition on the speech data by using the selected AM and outputs a result of the speed recognition.

The adaptation server 180 receives the device ID, the speech data of the device 100, which is identified by the device ID, and a usage data log that includes a result of the speech recognition performed on the speech data. The adaptation server 180 generates a device-adapted AM corresponding to the device ID, by using speech data of the usage data log corresponding to the device ID.

Elements such as the device 100, the ASR server 150, and the adaptation server 180 are connected to each other via a communication network or a local connection. For example, wired or wireless communication such as the Internet, a local area network (LAN), a wide area network (WAN), a telephone network, a wireless data communication network such as long-term evolution (LTE), or infrared communication may be employed. Accordingly, exemplary embodiments may be applied to various devices that may be connected to a wireless communication network, the Internet, or other communication methods, for example, a TV that may be connected to a wireless communication network or the Internet. In detail, exemplary embodiments may be applied to a telephone, a personal digital assistant (PDA), a tablet PC, an electronic book, a wrist watch (a smartwatch), glasses (smart glasses), a navigation system for a vehicle, an audio system for a vehicle, a video system for a vehicle, an integrated media system for a vehicle, telematics, a mobile terminal such as a laptop computer, a PC, an intelligent robot, or the like, FIG. 2 illustrates a diagram of the device 100 shown in FIG. 1.

The device 100 includes a memory 102, an input unit 104, a processor 106, a transmission unit 108, and a reception unit 110. The device 100 may further include an output unit such as a display unit or a speaker, or an input unit such as a touchscreen, a touch panel, a key pad, a touch pen, a mouse, or a keyboard.

The memory 102 stores device ID. The memory 102 may further store a program, an application, or data.

The input unit 104 receives speech for speech recognition from a user. The input unit 104 may use a speech of the user that is input via a microphone, a speech transmitted from another device or a server via a network, a speech file transmitted via a storage medium, or a speech of the other party, which is transmitted during a phone call.

The processor 106 generates speech data by processing a speech. The processor 106 generates speech data by performing signal processing such as analog/digital conversion, filtering, compressions, or encrypting on the speech. The processor 106 may further perform processing such as execution of a program or an application, or control of the device 100.

The transmission unit 108 transmits the device ID and the speech data generated by processing the speech to the ASR 150 shown in FIG. 1. The transmission unit 108 may further perform data transmission via a network or transmission of a wired or wireless phone call.

The reception unit 110 receives a result of speech recognition performed on the speech data from the ASR server 150. The reception unit 110 may further receive data via a network or receive a wired or wireless phone call.

The device 100 may receive an input of speech data from a user and processes the speech data, or receive a result of speech recognition performed on speech data or a result, obtained by further processing the speech data based on the result of the speech recognition, and transmit the result to the user. The result obtained by further processing the speech data may be, for example, provision of a result obtained through an Internet search based on a speech-recognized word or execution of a command based on a speech-recognized word such as transmission of a message about speech-recognized details, schedule management such as an input of a speech-recognized appointment, or audio/video playback of content having a speech-recognized title. The speech data input via the device 100 may be transmitted to the ASR server 150 without having to perform a particular processing on the speech data. Alternatively, only data needed for speech recognition, that is, a signal useful for the speech recognition, may be extracted from the speech data and transmitted to the ASR server 150. The signal useful for the speech recognition may be, for example, a signal from which noise is removed, an analog-digital-converted signal, a filtered signal, or a signal encrypted for security.

The device 100 has a unique device ID. If the device 100 accesses the ASR server 150, a device ID of the device 100 is provided to the ASR server 150 so that the ASR server 150 identifies the device 100. The device 100 may have one or more device IDs and, in this case, various settings of the device 100 may be allocated to each device ID. For example, a separate device ID may be allocated to an application for children among applications installed on a smartphone. A default device ID is allocated to a general application since a main user of the smartphone uses speech recognition. However, in a case of an application for children, since it may be highly possible that a child, who is a sub-user allowed to use the application for children by the main user, uses speech recognition, a separate device ID may be allocated to the application for children so as to increase the accuracy of a result of speech recognition.

A speaker adaptive method such as a case when a user ID is used instead of a device ID has the following several problems: a process of registering a speaker may cause a lot of user inconvenience. A procedure for generating an account to obtain an accurate user ID may be complicated and take a lot of time. Additionally, a speaker recognition method, which is performed by processing a speech signal, so as to determine the presence of a specified speaker is also employed. However, this may cause deterioration of speaker adaptation due to an error in speaker recognition. Additionally, if an account is generated by registering a speaker, information about a user ID may need to be managed directly by a server and this may cause a problem in personal information protection.

By using a device ID, an additional process of registering and thus obtaining a user ID may not be performed, and thus, the inconvenience by a process of registering a user ID is resolved. Additionally, a device ID of a client device may be stored instead of storing and managing a registered user ID, and an AM appropriate for the client device may be generated through adaptation.

FIG. 3A illustrates an embodiment of the ASR server 150 shown in FIG. 1. FIG. 3B illustrates another embodiment of the ASR server 150. FIG. 3C illustrates another embodiment of the ASR server 150.

Referring to FIG. 3A, the ASR server 150 includes an AM database 152, a reception unit 158, and a speech recognition unit 160. The ASR server 150 may further include an output unit such as a display unit or a speaker or an input unit such as a mouse or a keyboard, or a transmission unit that allows network communication.

The AM database 152 may store at least one AM.

The reception unit 158 receives, from the device 100 located outside the ASR server 150, a device ID for identifying the device 100 and speech data. The reception unit 158 may further receive data via a network or receive the wired or wireless phone call.

The ASR server 150 includes the speech recognition unit 160 to actually perform speech recognition, for example, an ASR engine and a model used for the ASR engine. The model may include an AM, a language model (LM), and a pronunciation dictionary.

The speech recognition unit 160 selects an AM from the AM database 152 based on the device ID received from the device 100 and processes the speech data received from the device 100 by using the selected AM, and then, outputs a result of speech recognition.

FIG. 3B illustrates a diagram of the ASR server 150 according to another exemplary embodiment. The ASR server 150 may perform a function of the ASR server 150 shown in FIG. 3A.

Referring to FIG. 3B, the AM database 152 may include a general AM 154 and at least one device-adapted AM 156.

The speech recognition unit 160 may be provided with an adapted AM, and two types of AMs may be loaded to the speech recognition unit 160. The general AM 154 is an AM applied to the device 100 for which the device-adapted AM 156 is not generated. The device-adapted AM 156 is a unique AM applied to a specified device ID and adapted to a specified device. The device-adapted AM 156 is collected in the AM database 152. The AM database 152 may include the general AM 154. Additionally, as shown in FIG. 3B, a plurality of the device-adapted AMs 156 may be included in the AM database 152.

FIG. 3C illustrates a diagram of the ASR server 150 according to another exemplary embodiment. The ASR server 150 may perform a function of the ASR server 150 shown in FIG. 3A.

Referring to FIG. 3C, the ASR server 150 may include a usage log database 184, a log monitor 186, and an AM adaptation unit 190. Additionally, although not illustrated, a log data filter 188 which is to be described later with respect to the adaptation server 180 may be included in the ASR server 150.

The speech recognition unit 160 outputs a result of speech recognition and, at the same time, generates a usage data log that contains information about a speech recognition operation. The usage data log that includes the result of the speech recognition is stored in the usage log database 184. Various pieces of information necessary for adaptation of an AM, for example, a date and time of a speech recognition operation, a result of speech recognition, a score of the result of the speech recognition, a device ID, a change by a user, or a result of the change, are stored in the usage data log. Since the device ID is used, a user ID is not stored in the ASR server 150, and thus, a problem of personal information protection does not occur.

The log monitor 186 selects a device ID of the device 100, which needs adaptation, by consistently monitoring the usage data log of the usage log database 184.

The AM adaptation unit 190 generates a device-adapted AM corresponding to the selected device ID, by using speech data of a usage data log corresponding to the device ID selected by the log monitor 186. The generated device-adapted AM is stored in the AM database 152.

The log monitor 186 and the AM adaptation unit 190 will be described later in detail with reference to the adaptation server 180.

FIG. 4A illustrates an embodiment of the adaptation server 180 shown in FIG. 1. FIG. 4B illustrates another embodiment of the adaptation server 180.

The adaptation server 180 adapts an AM corresponding to a specified device ID based on a usage data log. Referring to FIG. 4A, the adaptation server 180 includes a reception unit 182, the usage log database 184, the log monitor 186 for consistently monitoring the usage data log, and the AM application unit 190 for adapting a device-adapted AM. The adaptation server 150 may further include an output unit such as a display unit or a speaker, an input unit such as a key pad, or a transmission unit that may perform network communication.

The reception unit 182 receives a device ID, speech data of a device which is identified by the device ID, and a usage data log that includes a result of the speech recognition performed on the received speech data. The reception unit 182 may further receive data via a network or receive a wired or wireless phone call.

The usage data log that includes the result of the speech recognition performed on the received speech data is stored in the usage log database 184. Various pieces of information necessary for adaptation of an AM, for example, a date and time of a speech recognition operation, a result of speech recognition, a score for the result of the speech recognition, the device ID, whether the result of speech recognition has been modified by a user, or a modified result, are stored in the usage data log.

The log monitor 186 selects a device ID of the device, which needs adaptation, by consistently monitoring the usage data log of the usage log database 184.

The AM adaptation unit 190 generates a device-adapted AM corresponding to the device ID selected by the log monitor 186, by using speech data of a usage data log corresponding to the selected device ID. The generated device-adapted AM is stored in the AM database 152. In the current embodiment, the AM database 152 is installed in the speech recognition server 150. However, the AM database 152 may be installed in the adaptation server 180 or a separate device.

FIG. 4B illustrates a diagram of the adaptation server 180 according to another exemplary embodiment. The adaptation server 180 may perform a function of the adaptation server 180 shown in FIG. 4A.

Referring to FIG. 4B, the adaptation server 180 may further include a log data filter 188 for filtering unnecessary data from a usage data log selected via the log monitor 186.

The log data filter 188 removes speech data unnecessary for adaptation from a usage data log corresponding to a device ID selected by the log monitor 186. The AM adaptation unit 190 generates a device-adapted AM corresponding to the selected device ID, by using speech data of the usage data log from which the unnecessary speech data is removed.

FIG. 5 illustrates a block diagram for explaining a speech recognition and AM adaptation system according to an exemplary embodiment.

According to an exemplary embodiment, a method of adapting an AM is described with reference to the speech recognition and AM adaptation system shown in FIG. 5. The method of adapting an AM includes two processes: a process of performing speech recognition and applying an adapted AM and a process of generating a device-adapted AM.

The process of performing speech recognition and applying an AM is described with reference to FIG. 5.

The device 100 is connected to the ASR server 150 so as to use a speech recognition service. A unique device ID of the device 100 is transmitted to the ASR server 150, and the ASR server 150 obtains the device ID of the device 100. If the device ID of the device 100 is encrypted for security in a database in which the device ID is stored, this process includes a process of decrypting the device ID.

Since the device ID may be transmitted without user intervention, a process of explicitly registering a user ID is not performed, and thus, user convenience is enhanced.

The process of performing speech recognition is performed according to an order of checking of the device ID, loading of an AM, performing of speech recognition, and storing of a result of the speech recognition.

By using the obtained device ID, it is checked whether the device-adapted AM 156 for the device 100 corresponding to the device ID is present.

If the device-adapted AM 156 is present, the ASR server 150 loads the device-adapted AM 156.

Otherwise, if the device-adapted AM 156 is not present, the ASR server 150 loads the general AM 154. When the device 100 is connected to the ASR server 150 for a first time, since the device-adapted AM 156 is not present, the general AM 154 is loaded for speech recognition.

Other models 170 needed to load an AM, for example, a language model or a pronunciation dictionary, are also loaded to prepare speech recognition.

After an AM is loaded, the speech recognition unit 160 indicates that speech recognition is prepared, and the device 100 transmits speech data input by the user to the ASR server 150.

The ASR server 150 receives the input speech data and performs the speech recognition on the input speech data, and then, notifies a result of the speech recognition to the user via the device 100. A usage data log, in which information related to a recognition operation is collected, is transmitted to the usage log database 184 and stored in the usage log database 184 with the device ID.

The process of generating a device-adapted AM is described with reference to FIG. 5.

The generation of a device-adapted AM is performed according to an order of monitoring of a usage data log, selection of adaptive data, generation of an AM, and updating of the AM.

The log monitor 186 consistently generates a list of device IDs which need generation of a device-adapted AM by monitoring and analyzing a speech recognition usage data log in real time. To do this, the log monitor 186 may monitor a usage history for a certain period of time, an update record of an adaptive AM, and a record of collection of fresh (new) log data obtained after generating a previous adaptive model, with respect to the device 100. Records may be utilized by the log monitor 186 as follows:

Record of collection of fresh log data: whether a sufficient amount of data needed for generating a new adaptive AM is collected is inspected.

Update record of an adaptive AM: whether an existing adaptive AM is too old is inspected.

Usage history: whether a score has increased or whether a usage frequency is changed is inspected.

If it is determined by the log monitor 186 that a device ID needs generation of a device-adapted AM, a data filtering process of selecting speech data, which is to be used for new adaptation of an AM among usage log data, is performed on the device ID. The data filtering process includes a process of removing data if it is determined that the data is not needed in a device-adapted process, by using the following information:

Appropriateness of speech data: Whether speech data has characteristics of normal speech is detected. If speech data corresponds to a noise signal or has different characteristics from a plurality of pieces of speech data in a data group, the speech data can be excluded from a subsequent process of adapting an AM. In this process, if a main user or a main use environment of the device 100 changes, data appropriate for a new user or a new use environment is used so that an AM is automatically adapted. In detail, if a user or a main use environment of the device 100 changes, since only a small amount of data is appropriate for a new user or a new use environment, the data is excluded from the process of adapting an AM, and a large amount of data, that is, data appropriate for an existing user or use environment, is used. Then, as the number of times that the device 100 is used by a new user or in a new use environment increases, the amount of a new type of data gradually increases, and thus, a new user may become a main user or a new use environment may be a main use environment. Then, a device-adapted AM may be generated by using data appropriate for the new user or the new use environment, and the device-adapted AM may be automatically and continuously changed. A change of a user or a use environment of the device 100 may be automatically reflected in the process of obtaining a device ID and filtering data, instead of explicitly registering a user ID.

Appropriateness of a result of speech recognition: whether a result of recognition of speech data is reliable enough to be used in a process of adaptation is inspected.

Modification of a result of the speech recognition: the result of the speech recognition is compared to a result of existing speech recognition, and if a reliable result such as a result obtained after a user modifies the speech recognition is present, the speech recognition is modified. Alternatively, additional speech recognition may be performed to obtain a reliable result of the speech recognition. In this case, if necessary, an existing device-adapted AM may be employed.

Speech data selected through data filtering and information about the result of the recognition are input to an AM adaptation algorithm. Maximum a posteriori (MAP), maximum likelihood linear regression (MLLR), other types of AM adaptation algorithms, or a combination thereof may be employed as the AM adaptation algorithm. The AM adaptation algorithm may generate statistics information needed for converting a new adaptive AM or an existing AM into an adaptive AM.

The new adaptive AM or the conversion model substitutes an existing adaptive AM. If a new adaptive AM is generated for a first time, the device-adapted AM is associated with a device ID corresponding to the new adaptive AM, and stored in the device-adapted AM database 152.

By using a device-adapted AM corresponding to a device ID, the method of adapting an AM may be applied to not only a specified speaker, but also an environment in which a specified device is used, an environment setting of the device, or a user group using the device.

If the method of adapting an AM is employed, it may be possible to reflect in a device-adapted AM a pronunciation habit or an intonation of a speaker or a group of speakers using a specified device, or unique acoustic characteristics of an environment in which the device is used. Thus, the performance of a device may be enhanced. For example, regional characteristics, for example, dialects, pronunciation, or foreign language may be reflected in an device-adapted AM, by extracting location information of a device such as global positioning system (GPS) information or information about a location in which the device is connected to a network based on a device ID of the device.

If a user ID is used instead of a device ID, even when registration of a user is associated with speech recognition, and thus, a result of speech recognition may be used immediately, since a speaker adaptive model is generated by using a first speech of the user, an inaccurate model may be generated in many cases. This is because it is difficult to obtain a sufficient amount of data in a process of first registering the user, even though it is important to collect a sufficient amount of speech so as to generate a fine speaker adaptive model.

Since a device-adapted AM is generated by the adaptation server 180 by using a device ID and a usage data log corresponding to the device ID, the device-adapted AM may be generated by using the method of adapting an AM appropriate for each device by utilizing a result of speech recognition instead of registering a user. An efficient and consistent device-adaptive AM may be obtained by utilizing usage data log information of a speech recognition service, instead of obtaining speech data when a device ID is first obtained. Since the ARS server 150 or the adaptation server 180 stores a usage data log and consistently updates the device-adaptive AM, a latest adaptive AM may be employed and the performance thereof may be consistently enhanced.

Hereinafter, exemplary embodiments of a speech recognition method are described with reference to FIGS. 6A and 6B.

FIG. 6A illustrates a flowchart of a speech recognition method according to an exemplary embodiment.

In operation 602, a device ID for identifying a device is stored.

In operation 606, a speech for speech recognition is input by a user.

In operation 608, the speech input in operation 606 is processed to generate speech data.

In operation 610, the device ID and the speech data generated in operation 608 are transmitted to an ASR server.

In operation 614, a result of the speech recognition performed on the speech data is received from the ASR server.

FIG. 6B illustrates a flowchart of a speech recognition method according to another exemplary embodiment.

In operation S602, a plurality of device IDs for identifying a device may be stored in the device.

In operation 604, settings of the device may vary depending on the plurality of device IDs stored in operation S602, and a device ID is selected.

In operation 606, a speech for speech recognition is input by a user.

In operation 608, the speech input in operation 606 is processed to generate speech data.

In operation 610, the device ID selected in operation 604 and the speech data generated in operation 608 are transmitted to an ASR server.

In operation 612, location information about the device may be further transmitted to the ASR server. The location information about the device such as GPS information or information about a location in which the device is connected to a network is extracted based on the device ID so as to reflect regional characteristics of the speech (for example, dialects, pronunciation, or foreign language) in an AM.

In operation 614, a result of the speech recognition performed on the speech data is received from the ASR server.

Hereinafter, exemplary embodiments of the method of recognizing speech are described with reference to FIGS. 7A and 7B.

FIG. 7A illustrates a flowchart of the speech recognition method according to an exemplary embodiment.

In operation 702, at least one AM is stored.

In operation 704, a device ID for identifying a device is obtained from the device that is located outside.

In operation 706, speech data is obtained from the device.

In operation 708, an AM is selected based on the device ID obtained in operation 704.

In operation 716, speech recognition is performed on the speech data obtained in operation 706, by using the AM selected in operation 708.

In operation 718, a result of the speech recognition performed in operation 716 is output.

FIG. 7B illustrates a flowchart of the speech recognition method according to another exemplary embodiment.

In operation 702, a general AM and at least one device-adapted AM are stored.

In operation 704, a device ID for identifying the device is obtained from an external device.

In operation 706, speech data is obtained from the device.

In operation 710, it is determined whether a device-adapted AM corresponding to the device ID, obtained in operation 704, is present.

As a result of the determining in operation 710, if the device-adapted AM corresponding to the device ID is present ('YES' in operation 710), the device-adapted AM is selected in operation 712.

As a result of the determining in operation 710, otherwise, if the device-adapted AM corresponding to the device ID is not present (NO' in operation 710), a general AM is selected in operation 714.

In operation 716, speech recognition is performed on the speech data, obtained in operation 706, by using the device-adapted AM selected in operation 712 or the general AM is selected in operation 714.

In operation 718, a result of the speech recognition performed in operation 716 is output.

In operation 720, the result of the speech recognition performed in operation 716 and a usage data log that includes the speech data are stored in a usage log database.

In operation 722, a device ID that needs adaptation is selected by monitoring the usage log database.

In operation 724, a device-adapted AM corresponding to the selected device ID, by using speech data of the usage data log corresponding to the device ID selected in operation 722.

Hereinafter, exemplary embodiments of the speech recognition method are described with reference to FIGS. 8A and 8B.

FIG. 8A illustrates a flowchart of the speech recognition method according to an exemplary embodiment.

In operation 802, a device ID, speech data of a device which is identified by the device ID, a usage data log that includes a result of speech recognition performed on the speech data are received.

In operation 804, the usage data log received in operation 802 is stored in a usage log database.

In operation 808, a device ID that needs adaptation is selected by monitoring the usage log database.

In operation 814, a device-adapted AM corresponding to the selected device ID is generated, by using speech data of the usage data log corresponding to the device ID selected in operation 808.

FIG. 8B illustrates a flowchart of an AM adaptation method according to another exemplary embodiment.

In operation 802, a device ID, speech data of a device which is identified by the device ID, a usage data log that includes a result of speech recognition performed on the speech data are received.

In operation 804, the usage data log received in operation 802 is stored in a usage log database.

In operation 806, the usage log database is analyzed by using at least one selected from the group consisting of an update record of an adaptive AM, a usage history, and a record of collection of fresh log data.

In operation 808, a device ID that needs adaptation is selected by monitoring the usage log database, based on a result of the analyzing performed in operation 806.

In operation 810, the speech data is analyzed by using at least one selected from the group consisting of appropriateness of the speech data, appropriateness of the result of the speech recognition, and a record of modification of the result of the speech recognition so as to remove unnecessary speech data.

In operation 812, the speech data unnecessary for adaptation is removed from the usage data log corresponding to the device ID selected in operation 808, based on a result of the analyzing in operation 810.

In operation 814, a device-adapted AM corresponding to the device ID selected in operation 808 is generated by using speech data of the usage data log from which the unnecessary speech data is removed.

In addition, other exemplary embodiments can also be implemented through computer-readable code/instructions in/on a medium, e.g., a computer-readable medium, to control at least one processing element to implement any above-described exemplary embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A server comprising:
a memory configured to store an acoustic model (AM) database for storing at least one AM, the AM database comprising a general AM and at least one device-adapted AM;
a receiver configured to obtain, from a device located outside the server, a device ID, which is encrypted, for identifying the device and speech data; and
a processor configured to, based on identifying that a device-adapted AM corresponding to the device ID is stored in the AM database, perform speech recognition on the speech data by using the device-adapted AM, and based on identifying that the device-adapted AM corresponding to the device ID is not stored in the AM database, perform speech recognition on the speech data by using the general AM, and output a result of the speech recognition,
wherein the memory is further configured to store a usage log database for storing a usage data log that includes the result of the speech recognition and the speech data corresponding to the result of the speech recognition,
wherein the processor is further configured to select a device ID that needs device adaptation, by monitoring the usage log database, remove speech data that is unnecessary for the device adaptation from the usage data log corresponding to the selected device ID, and generate a device-adapted AM corresponding to the selected device ID, by using speech data of the usage data log from which the speech data that is unnecessary is removed,
wherein the processor is further configured to identify that the speech data is unnecessary based on a modification record of the result of the speech recognition, and
wherein the modification record of the result of the speech recognition includes a more reliable result obtained by user's modification upon identifying that a more reliable result of the speech recognition exists.

2. A speech recognition method comprising:
storing an acoustic model (AM) database comprising a general AM and at least one device-adapted AM;
obtaining, from a device located outside a server, a device ID, which is encrypted, for identifying the device;
obtaining speech data from the device;
based on identifying that a device-adapted AM corresponding to the device ID is stored in the AM database, performing speech recognition on the speech data by using the device-adapted AM, and based on identifying that the device-adapted AM corresponding to the device ID is not stored in the AM database, performing speech recognition on the speech data by using the general AM;
outputting a result of the speech recognition;
storing a usage data log that includes the result of the speech recognition and the speech data corresponding to the result of the speech recognition in a usage log database;
selecting a device ID that needs device adaptation, by monitoring the usage log database and removing speech data that is unnecessary for the device adaptation from the usage data log corresponding to the selected device ID; and
generating a device-adapted AM corresponding to the selected device ID, by using speech data of the usage data log from which the speech data that is unnecessary is removed,
wherein the removing the speech data that is unnecessary comprises identifying that the speech data is unnecessary based on a modification record of the result of the speech recognition, and
wherein the modification record of the result of the speech recognition includes a more reliable result obtained by user's modification upon identifying that a more reliable result of the speech recognition exists.

3. A non-transitory computer-readable recording storage medium having stored thereon a computer program, which when executed by a computer, performs the method of claim 2.

4. A device comprising:
a memory configured to store a device ID, which is encrypted, for identifying a device; and
at least one processor configured to execute instructions stored in the memory to implement:
an input interface configured to obtain an input of a speech for speech recognition;
a speech generator configured to generate speech data by processing the speech;
a transmitter configured to transmit the device ID and the speech data to an automatic speech recognition (ASR) server; and
a receiver configured to obtain a result of the speech recognition performed on the speech data from the ASR server, the result of the speech recognition comprising an identification of whether a device-adapted acoustic model (AM) corresponding to the device ID is stored in an acoustic model AM database in the server,
wherein the speech recognition further comprises selecting a device ID that needs device adaptation, by monitoring a usage log database, remove speech data unnecessary for the device adaptation from the usage data log corresponding to the selected device ID, and generating a device-adapted AM corresponding to the selected device ID, by using speech data of the usage data log from which the unnecessary speech data is removed, wherein the processor is further configured to identify that the speech data is unnecessary based on a modification record of the result of the speech recognition, and wherein the modification record of the result of the speech recognition includes a more reliable result obtained by user's modification upon identifying that a more reliable result of the speech recognition exists.

5. The device of claim 4, wherein the at least one processor is further configured to extract data used for the speech recognition, as speech data.

6. The device of claim 4, wherein the device has a plurality of device identifications (IDs).

7. The device of claim 6, wherein a setting of the device varies depending on the device IDs.

8. The device of claim 4, wherein the transmitter is further configured to transmit location information of the device.

* * * * *